United States Patent
Zhou et al.

(10) Patent No.: US 12,449,585 B1
(45) Date of Patent: Oct. 21, 2025

(54) DISPLAY DEVICE

(71) Applicant: AUO Corporation, Hsinchu (TW)

(72) Inventors: Ting Han Zhou, Hsinchu (TW);
Pang-Hsuan Liu, Hsinchu (TW);
Kuo-Yen Chang, Hsinchu (TW);
Yu-Tsung Huang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/957,848

(22) Filed: Nov. 24, 2024

(30) Foreign Application Priority Data

Oct. 25, 2024 (TW) .................................. 113140773

(51) Int. Cl.
*F21V 8/00* (2006.01)
*G02F 1/13357* (2006.01)
*G03B 30/00* (2021.01)

(52) U.S. Cl.
CPC ......... *G02B 6/0055* (2013.01); *G02B 6/0068* (2013.01); *G02F 1/133605* (2013.01); *G02F 1/133615* (2013.01); *G03B 30/00* (2021.01)

(58) Field of Classification Search
CPC .. G02B 6/0055; G02F 1/133605; G03B 30/00
See application file for complete search history.

(56) References Cited

U.S. PATENT DOCUMENTS

| | | | |
|---|---|---|---|
| 11,333,923 | B2 | 5/2022 | Yang |
| 11,668,972 | B2 | 6/2023 | Takimoto et al. |
| 11,947,218 | B1* | 4/2024 | Liu .................. G02F 1/133608 |
| 11,982,900 | B2 | 5/2024 | Takimoto et al. |
| 2021/0294015 | A1* | 9/2021 | Yin ...................... G02B 6/0051 |
| 2022/0091316 | A1 | 3/2022 | Long et al. |

FOREIGN PATENT DOCUMENTS

| | | |
|---|---|---|
| CN | 110441958 | 11/2019 |
| CN | 209707863 | 11/2019 |
| CN | 209708006 | 11/2019 |
| CN | 112262340 | 1/2021 |
| TW | 202101039 | 1/2021 |

\* cited by examiner

*Primary Examiner* — Keith G. Delahoussaye
(74) *Attorney, Agent, or Firm* — JCIPRNET (57) ABSTRACT

A display device is provided, which includes a backlight module, a light modulation module, and a camera module. The light modulation module is configured to modulate light from the backlight module. The camera module includes a lens assembly. The backlight module is disposed between the camera module and the light modulation module, and includes a first reflective element. The first reflective element is arranged in accordance with the arrangement of the lens assembly. A reflectance of the first reflective element for the visible band ranges from 35% to 95%, and a transmittance of the first reflective element for the infrared band is greater than 0%.

14 Claims, 7 Drawing Sheets

FIG. 6

DISPLAY DEVICE

CROSS-REFERENCE TO RELATED APPLICATION

This application claims the priority benefit of Taiwan application serial no. 113140773, filed on Oct. 25, 2024. The entirety of the above-mentioned patent application is hereby incorporated by reference herein and made a part of this specification.

BACKGROUND

Technical Field

The disclosure relates to a display device.

Description of Related Art

Nowadays, car manufacturers widely utilize camera systems to enhance driving safety. Specifically, camera modules are configured within in-vehicle display devices. However, the display area may have a dark hole that gives the driver a sense of being watched, and the dark hole may also reduce the display quality.

SUMMARY

The disclosure provides a display device that is capable of displaying images and capturing images, in which a camera module corresponds to a display area without producing a dark hole.

According to an embodiment of the disclosure, a display device is provided, which includes a backlight module, a light modulation module, and a camera module. The light modulation module is configured to modulate light from the backlight module. The camera module includes a lens assembly. The backlight module is disposed between the camera module and the light modulation module, and the backlight module includes a first reflective element. The first reflective element is arranged in accordance with the arrangement of the lens assembly. A reflectance of the first reflective element for a visible band falls in a range of 35% to 95%, and a transmittance of the first reflective element for an infrared band is greater than 0%.

Based on the above, the display device according to an embodiment of the disclosure includes the backlight module and the camera module. The backlight module has the first reflective element arranged therein corresponding to the lens assembly of the camera module, and the first reflective element allows infrared light to pass through. Therefore, the camera module can be implemented as an infrared camera module, and the display device can be used to display images and capture images. Furthermore, the first reflective element can reflect visible light, thereby preventing the appearance of a dark hole in the display device. Since the first reflective element can correspond to the display area of the display device, and is not limited to the non-display area, the flexibility in design of the display device is greatly improved.

To make the above-mentioned features and advantages of the disclosure more understandable, exemplary embodiments will be described in detail below in conjunction with the accompanying drawings.

DESCRIPTION OF THE EMBODIMENTS

Figure 1:
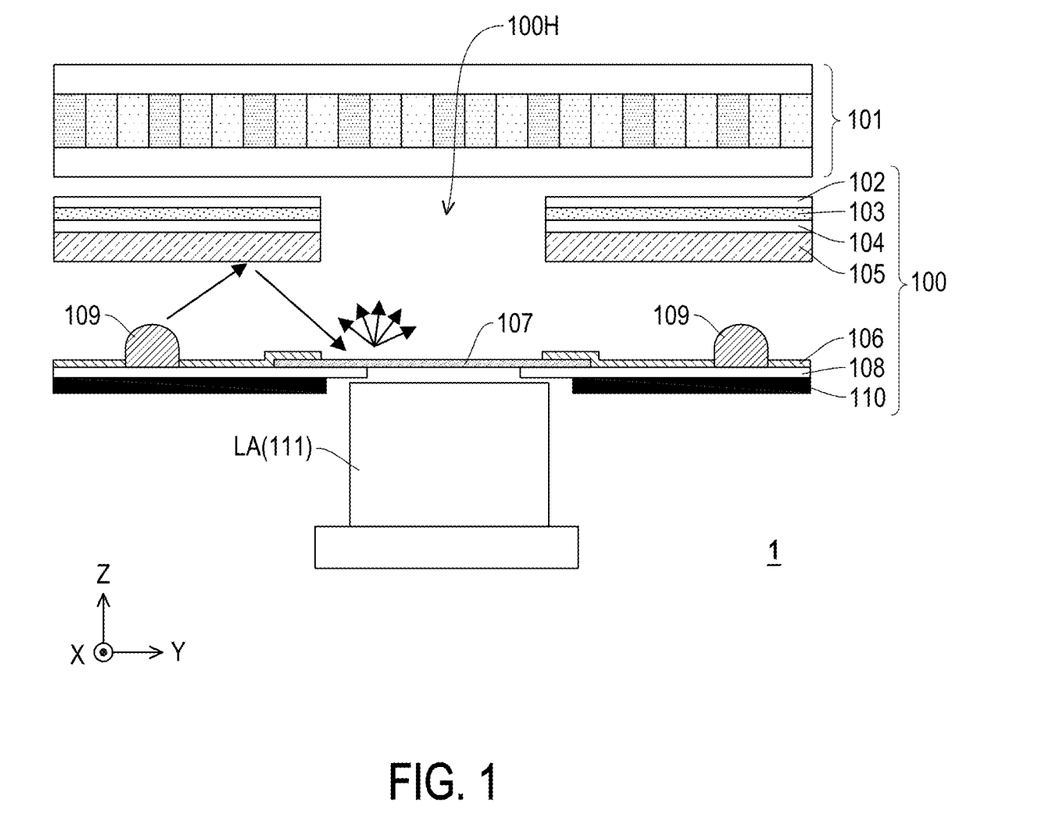
FIG. 1, FIG. 2A, FIG. 3, and FIG. 4 are schematic diagrams showing the display devices according to some embodiments of the disclosure.

Referring to FIG. 1, FIG. 1 is a schematic diagram showing the display device according to the first embodiment of the disclosure. A display device 1 includes a backlight module 100, a light modulation module 101, and a camera module 111. The light modulation module 101 is, for example, a liquid crystal display panel configured to modulate light from the backlight module 100. The camera module 111 includes a lens assembly LA. The backlight module 100 is disposed between the camera module 111 and the light modulation module 101. The backlight module 100 includes a first reflective element 107, and the first reflective element 107 is arranged in accordance with the arrangement of the lens assembly LA. The reflectance of the first reflective element 107 for the visible band falls in a range of 65% to 95%, and the transmittance of the first reflective element 107 for the infrared band is greater than 0%.

Since light in the infrared band can pass through the first reflective element 107, the camera module 111 may be an infrared camera module. In an exemplary embodiment, the transmittance of the first reflective element 107 for the infrared band falls in a range of 60% to 95%. In addition, since the reflectance of the first reflective element 107 for the visible band falls in a range of 65% to 95%, visible light from the backlight module 100 can be reflected by the first reflective element 107, and the first reflective element 107 is visible. Compared to a comparative example without the first reflective element 107, the display device 1 of this embodiment prevents the appearance of a dark hole in the area corresponding to the lens assembly LA. In other words, this area may be in the display area of the display device 1, which greatly improves the flexibility in design of the display device 1. The first reflective element 107 of this embodiment may be implemented with 3M™ Sensor Camouflage Film, but is not limited thereto.

Figure 5:
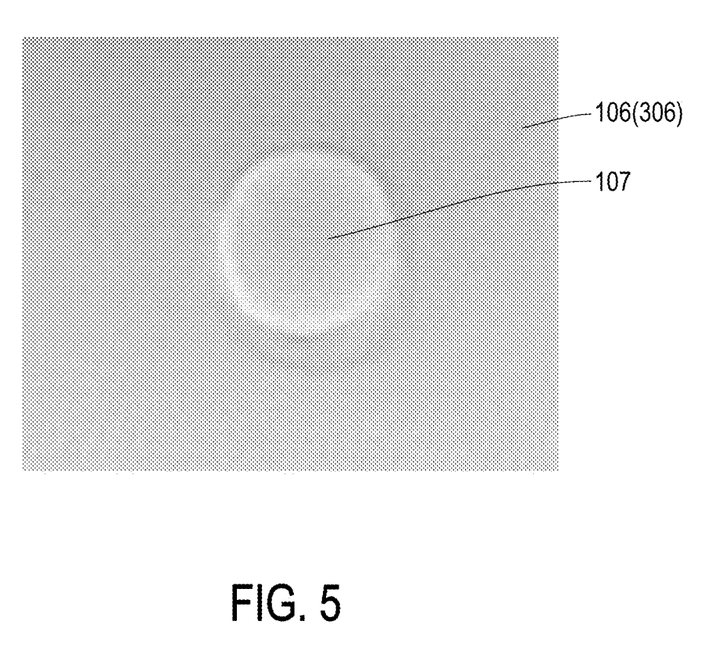
FIG. 5 and FIG. 6 are partial images of the display devices according to embodiments of the disclosure.

The backlight module 100 may further include multiple light-emitting elements 109, a diffusion plate 105, a prism sheet 104, a diffusion sheet 103, and a brightness enhancement film 102. The diffusion plate 105, the prism sheet 104, the diffusion sheet 103, and the brightness enhancement film 102 are stacked in sequence to form a stack structure, but the sequence in which the diffusion plate 105, the prism sheet 104, the diffusion sheet 103, and the brightness enhancement film 102 are stacked is not limited thereto. The stack structure has an opening 100H arranged to overlap the first reflective element 107. The light emitted by the multiple light-emitting elements 109 is reflected by this stack structure, and then advances toward the first reflective element 107 to make the first reflective element 107 visible, as shown in FIG. 5.

The backlight module 100 may further include a second reflective element 106, which is arranged in the same layer as the first reflective element 107. Accordingly, the light provided by the light-emitting elements 109 is prevented from being absorbed by a circuit board 108 and a back plate 110, thereby improving the current efficiency of the display device 1.

Figure 2A:
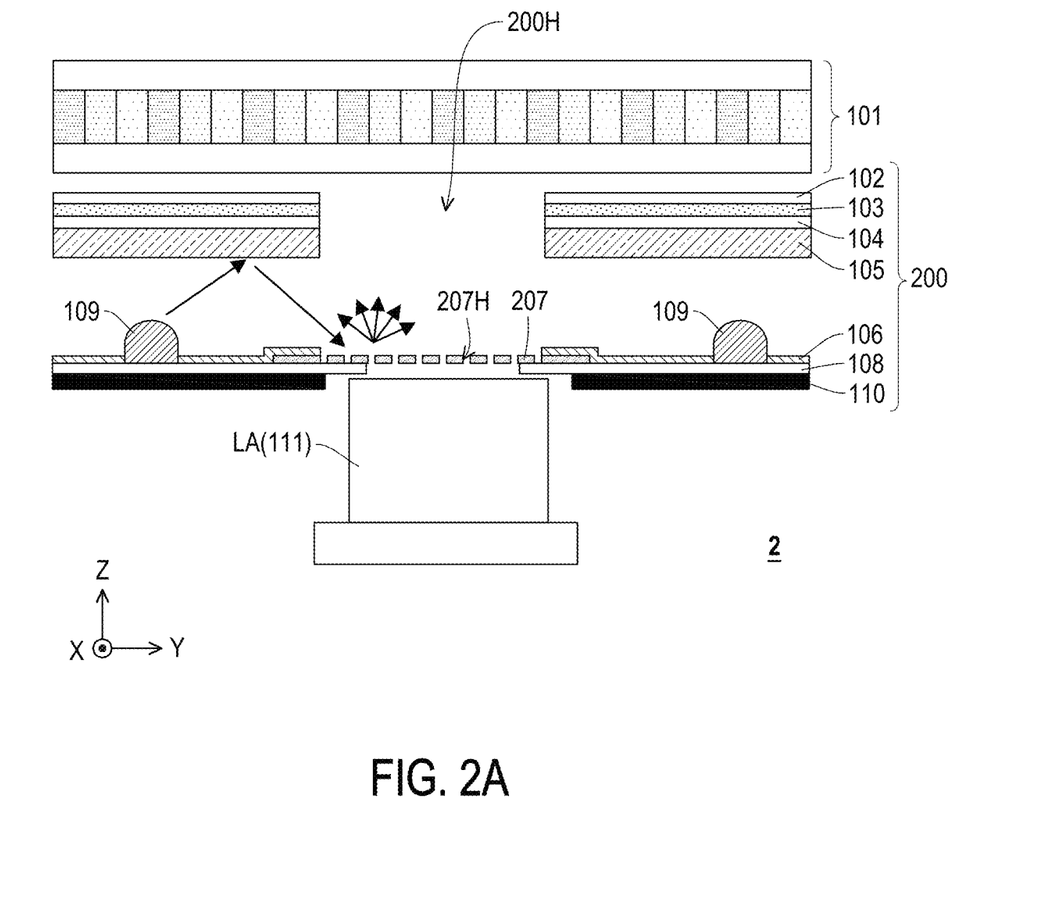
Figure 2B:
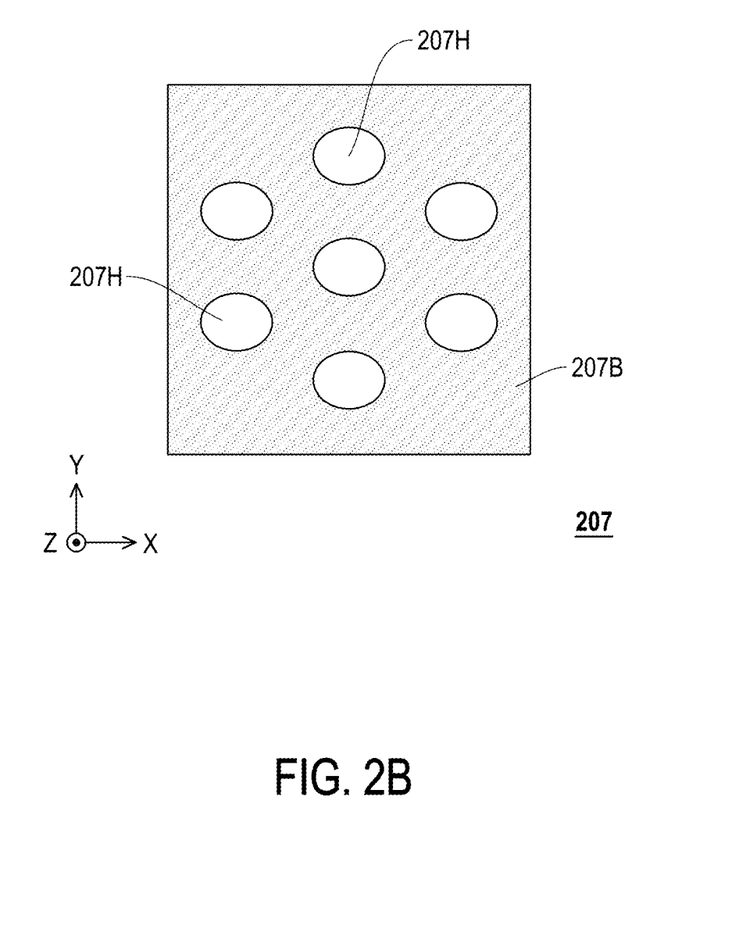
FIG. 2B is a schematic diagram showing the first reflective element according to an embodiment of the disclosure.

Referring to FIG. 2A and FIG. 2B, FIG. 2A is a schematic diagram showing the display device according to the second embodiment of the disclosure, and FIG. 2B is a schematic diagram showing the first reflective element according to the second embodiment. A display device 2 includes a backlight module 200, a light modulation module 101, and a camera module 111. The light modulation module 101 is, for example, a liquid crystal display panel configured to modulate light from the backlight module 200. The camera module 111 includes a lens assembly LA. The backlight module 200 is disposed between the camera module 111 and the light modulation module 101. The backlight module 200 includes a first reflective element 207, and the first reflective element 207 is arranged in accordance with the arrangement of the lens assembly LA. The reflectance of the first reflective element 207 for the visible band falls in a range of 35% to 65%, and the transmittance of the first reflective element for the infrared band is greater than 0%.

Since light in the infrared band can pass through the first reflective element 207, the camera module 111 may be an infrared camera module. In an exemplary embodiment, the transmittance of the first reflective element 207 for the infrared band falls in a range of 30% to 60%. In addition, since the reflectance of the first reflective element 207 for the visible band falls in a range of 35% to 65%, visible light from the backlight module 200 can be reflected by the first reflective element 207, and the first reflective element 207 is visible. Compared to a comparative example without the first reflective element 207, the display device 2 of this embodiment prevents the appearance of a dark hole in the area corresponding to the lens assembly LA. In other words, this area may be in the display area of the display device 2, which greatly improves the flexibility in design of the display device 2.

The first reflective element 207 has a body 207B and multiple first through holes 207H penetrating the body 207B. The transmittance of the body 207B for the infrared band may be, for example, close to 0%, and the reflectance of the surface of the body 207B toward the +Z direction for the visible band may be greater than or equal to 90%. The vertical projection area of each first through hole 207H on the optical effective area of the lens assembly LA is not zero. Accordingly, infrared light incident on the display device 2 can pass through these first through holes 207H and form an image in the camera module 111. In some embodiments, the aperture ratio of the first reflective element 207 falls in a range of 30% to 60% (that is, the transmittance of the first reflective element 207 for the infrared band falls in a range of 30% to 60%), or falls in a range of 35% to 65% (that is, the transmittance of the first reflective element 207 for the infrared band falls in a range of 35% to 65%).

In an embodiment, the display device 2 is implemented as an in-vehicle display device, with the object distance of the lens assembly LA falling in a range of 55 cm to 65 cm, and the full field of view angle being greater than or equal to 30 degrees. The aperture ratio of the first reflective element 207 falls in a range of 48% to 52%, the aperture width of each first through hole 207H falls in a range of 0.25 mm to 0.35 mm, and the spacing between adjacent first through holes 207H falls in a range of 0.08 mm to 0.12 mm.

Figure 6:
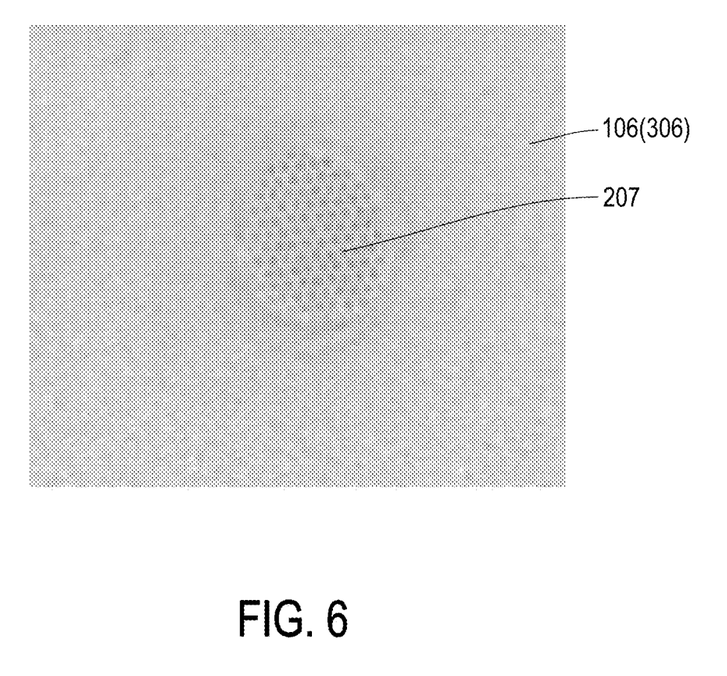

The backlight module 200 may further include multiple light-emitting elements 109, a diffusion plate 105, a prism sheet 104, a diffusion sheet 103, and a brightness enhancement film 102. The diffusion plate 105, the prism sheet 104, the diffusion sheet 103, and the brightness enhancement film 102 are stacked in sequence to form a stack structure, but the sequence in which the diffusion plate 105, the prism sheet 104, the diffusion sheet 103, and the brightness enhancement film 102 are stacked is not limited thereto. The stack structure has an opening 200H arranged to overlap the first reflective element 207. The light emitted by the multiple light-emitting elements 109 is reflected by this stack structure, and then advances toward the first reflective element 207 to make the first reflective element 207 visible, as shown in FIG. 6.

The backlight module 200 may further include a second reflective element 106, which is arranged in the same layer as the first reflective element 207. The second reflective element 106 has multiple second through holes. The light-emitting elements 109 respectively pass through the second through holes of the second reflective element 106. The aperture width of each second through hole is greater than the aperture width of each first through hole 207H, as shown in FIG. 2A.

Figure 3:
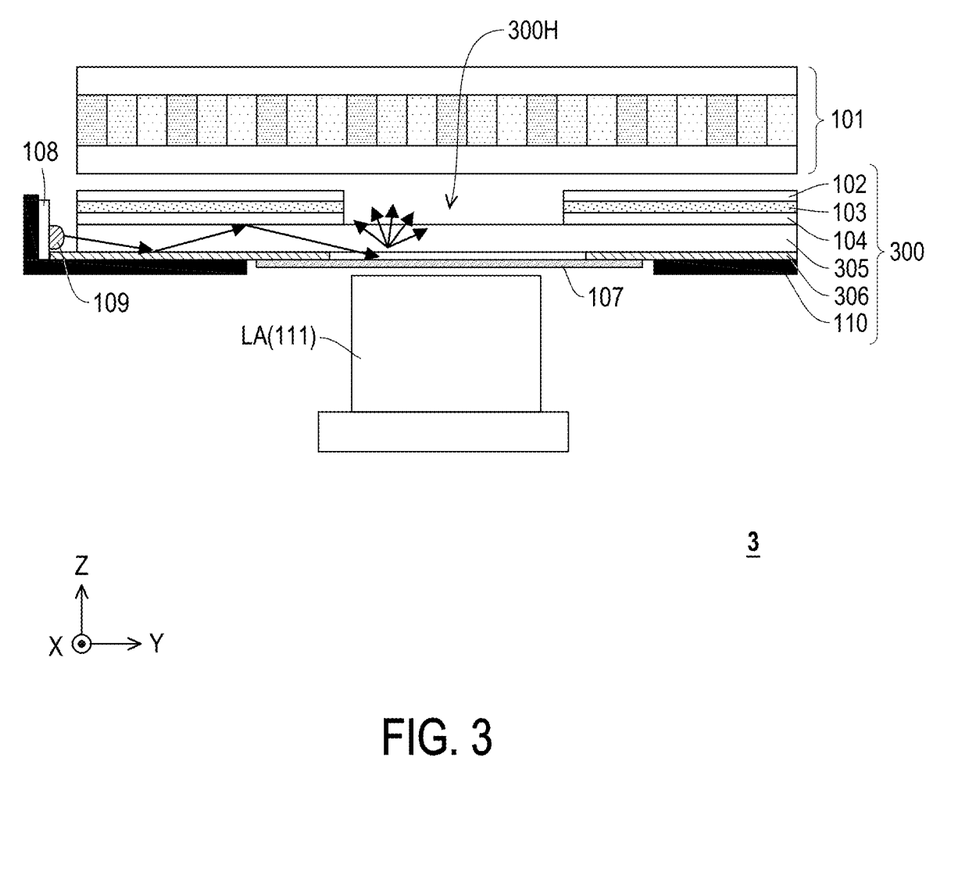

Referring to FIG. 3, FIG. 3 is a schematic diagram showing the display device according to the third embodiment of the disclosure. A display device 3 includes a backlight module 300, a light modulation module 101, and a camera module 111. The light modulation module 101 is, for example, a liquid crystal display panel configured to modulate light from the backlight module 300. The camera module 111 includes a lens assembly LA. The backlight module 300 is disposed between the camera module 111 and the light modulation module 101. The backlight module 300 includes a first reflective element 107 which is arranged in accordance with the arrangement of the lens assembly LA. The reflectance of the first reflective element 107 for the visible band falls in a range of 65% to 95%, and the transmittance of the first reflective element 107 for the infrared band is greater than 0%.

Since light in the infrared band can pass through the first reflective element 107, the camera module 111 may be an infrared camera module. In an exemplary embodiment, the transmittance of the first reflective element 107 for the infrared band falls in a range of 60% to 95%. In addition, since the reflectance of the first reflective element 107 for the visible band falls in a range of 65% to 95%, visible light from the backlight module 300 can be reflected by the first reflective element 107, and the first reflective element 107 is visible. Compared to a comparative example without the first reflective element 107, the display device 3 of this embodiment prevents the appearance of a dark hole in the area corresponding to the lens assembly LA. In other words, this area may be in the display area of the display device 3, which greatly improves the flexibility in design of the display device 3. The first reflective element 107 of this embodiment may be implemented with 3M™ Sensor Camouflage Film, but is not limited thereto.

The backlight module 300 may further include multiple light-emitting elements 109, a prism sheet 104, a diffusion sheet 103, and a brightness enhancement film 102. The prism sheet 104, the diffusion sheet 103, and the brightness enhancement film 102 are stacked in sequence to form a stack structure. The stack structure has an opening 300H arranged to overlap the first reflective element 107. The backlight module 300 further includes a light guide plate 305, and the area of the light guide plate 305 corresponding to the first reflective element 107 has no through hole. The light emitted by the multiple light-emitting elements 109 may advance toward the first reflective element 107 through the light guide plate 305, making the first reflective element 107 visible, as shown in FIG. 5.

The backlight module 300 may further include a second reflective element 306, which is arranged in the same layer as the first reflective element 107. Accordingly, the light provided by the light-emitting elements 109 is prevented from being absorbed by a back plate 110, thereby improving the current efficiency of the display device 3.

Figure 4:
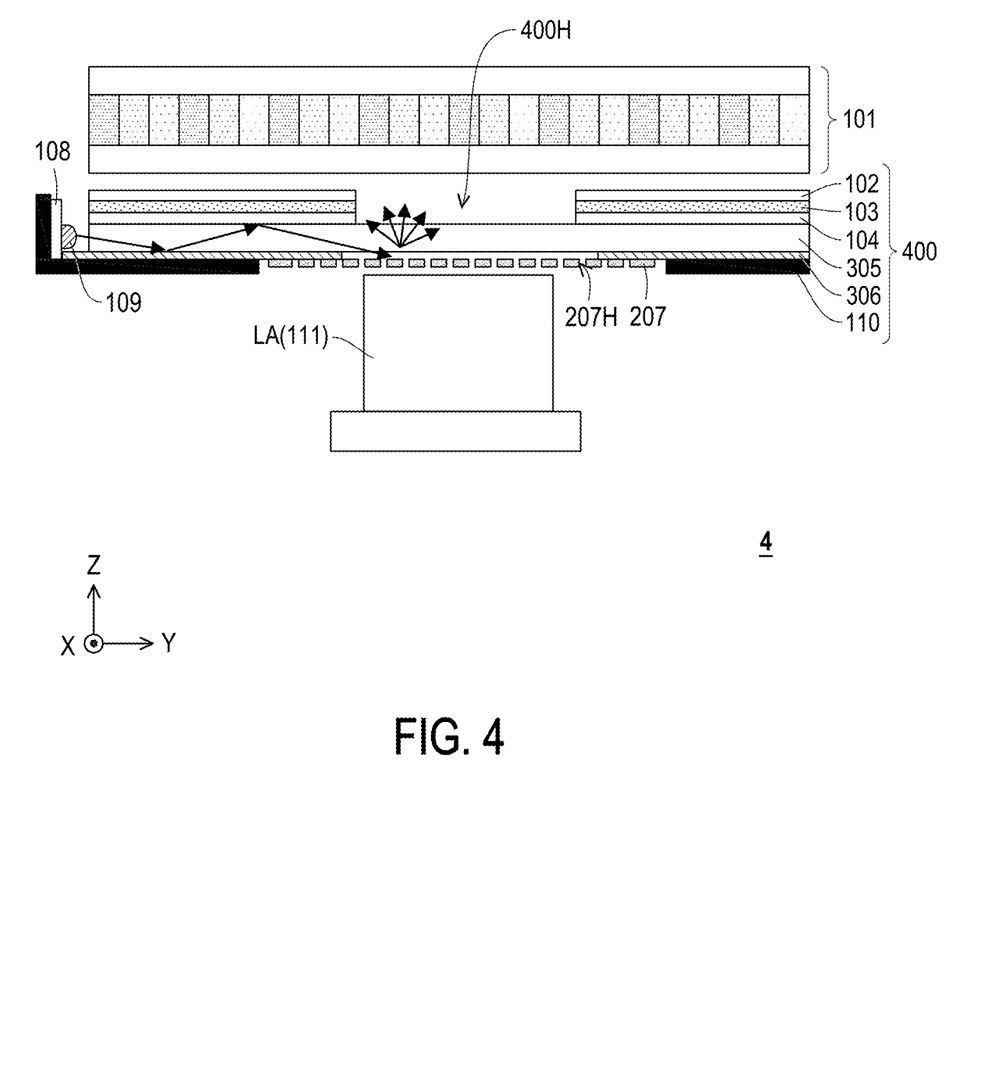

Referring to FIG. 4 and FIG. 2B, FIG. 4 is a schematic diagram showing the display device according to the fourth embodiment of the disclosure, and FIG. 2B is a schematic diagram showing the first reflective element according to the fourth embodiment. A display device 4 includes a backlight module 400, a light modulation module 101, and a camera module 111. The light modulation module 101 is, for example, a liquid crystal display panel configured to modulate light from the backlight module 400. The camera module 111 includes a lens assembly LA. The backlight module 400 is disposed between the camera module 111 and the light modulation module 101. The backlight module 400 includes a first reflective element 207 which is arranged in accordance with the arrangement of the lens assembly LA. The reflectance of the first reflective element 207 for the visible band falls in a range of 35% to 65%, and the transmittance of the first reflective element 207 for the infrared band is greater than 0%.

Since light in the infrared band can pass through the first reflective element 207, the camera module 111 may be an infrared camera module. In an exemplary embodiment, the transmittance of the first reflective element 207 for the infrared band falls in a range of 30% to 60%. In addition, since the reflectance of the first reflective element 207 for the visible band falls in a range of 35% to 65%, visible light from the backlight module 400 can be reflected by the first reflective element 207, and the first reflective element 207 is visible. Compared to a comparative example without the first reflective element 207, the display device 4 of this embodiment prevents the appearance of a dark hole in the area corresponding to the lens assembly LA. In other words, this area may be in the display area of the display device 4, which greatly improves the flexibility in design of the display device 4.

The first reflective element 207 has a body 207B and multiple first through holes 207H penetrating the body 207B. The transmittance of the body 207B for the infrared band may be, for example, close to 0%, and the reflectance of the surface of the body 207B toward the +Z direction for the visible band may be greater than or equal to 90%. The vertical projection area of each first through hole 207H on the optical effective area of the lens assembly LA is not zero. Accordingly, infrared light incident on the display device 4 can pass through these first through holes 207H and form an image in the camera module 111. In some embodiments, the aperture ratio of the first reflective element 207 falls in a range of 30% to 60% (that is, the transmittance of the first reflective element 207 for the infrared band falls in a range of 30% to 60%), or falls in a range of 35% to 65% (that is, the transmittance of the first reflective element 207 for the infrared band falls in a range of 35% to 65%).

In an embodiment, the display device 4 is implemented as an in-vehicle display device, with the object distance of the lens assembly LA falling in a range of 55 cm to 65 cm, and the full field of view angle being greater than or equal to 30 degrees. The aperture ratio of the first reflective element 207 falls in a range of 48% to 52%, the aperture width of each first through hole 207H falls in a range of 0.25 mm to 0.35 mm, and the spacing between adjacent first through holes 207H falls in a range of 0.08 mm to 0.12 mm.

The backlight module 400 may further include multiple light-emitting elements 109, a prism sheet 104, a diffusion sheet 103, and a brightness enhancement film 102. The prism sheet 104, the diffusion sheet 103, and the brightness enhancement film 102 are stacked in sequence to form a stack structure. The stack structure has an opening 400H arranged to overlap the first reflective element 207. The backlight module 400 further includes a light guide plate 305, and the area of the light guide plate 305 corresponding to the first reflective element 207 has no through hole. The light emitted by the multiple light-emitting elements 109 may advance toward the first reflective element 207 through the light guide plate 305, making the first reflective element 207 visible, as shown in FIG. 6.

The backlight module 400 may further include a second reflective element 306, which is arranged in the same layer as the first reflective element 207. Accordingly, the light provided by the light-emitting elements 109 is prevented from being absorbed by a back plate 110, thereby improving the current efficiency of the display device 4.

In summary, the display device according to an embodiment of the disclosure includes the backlight module and the camera module. The backlight module has the first reflective element arranged therein corresponding to the lens assembly of the camera module, and the first reflective element allows infrared light to pass through. Therefore, the camera module can be implemented as an infrared camera module, and the display device can be used to display images and capture images. Furthermore, the first reflective element can reflect visible light, thereby preventing the appearance of a dark hole in the display device. Since the first reflective element can correspond to the display area of the display device, and is not limited to the non-display area, the flexibility in design of the display device is greatly improved.

What is claimed is:

1. A display device, comprising:
   a backlight module;
   a light modulation module configured to modulate light from the backlight module; and
   a camera module comprising a lens assembly,
   wherein the backlight module is disposed between the camera module and the light modulation module,
   the backlight module comprises a first reflective element,
   the first reflective element is arranged in accordance with arrangement of the lens assembly, and
   a reflectance of the first reflective element for a visible band falls in a range of 35% to 95%, and a transmittance of the first reflective element for an infrared band is greater than 0%,
   wherein the first reflective element has a plurality of first through holes, and a vertical projection area of each of the plurality of first through holes on an optical effective area of the lens assembly is not zero.

2. The display device according to claim 1, wherein an aperture ratio of the first reflective element falls in a range of 30% to 60%.

3. The display device according to claim 1, wherein an aperture ratio of the first reflective element falls in a range of 35% to 65%.

4. The display device according to claim 1, wherein an aperture ratio of the first reflective element falls in a range of 48% to 52%.

5. The display device according to claim 1, wherein the reflectance of the first reflective element for the visible band falls in a range of 35% to 65%.

6. The display device according to claim 1, wherein the transmittance of the first reflective element for the infrared band falls in a range of 30% to 60%.

7. The display device according to claim 1, wherein the backlight module further comprises a second reflective element,
   the second reflective element has a plurality of second through holes, and an aperture width of each of the plurality of second through holes is greater than an aperture width of each of the plurality of first through holes.

8. The display device according to claim 7, wherein the first reflective element and the second reflective element are arranged in a same layer.

9. The display device according to claim 7, wherein the backlight module further comprises a plurality of light-emitting elements, and the plurality of light-emitting elements are arranged corresponding to the plurality of second through holes.

10. The display device according to claim 1, wherein the backlight module further comprises at least one optical layer, the at least one optical layer has an opening, and the opening is arranged to overlap the first reflective element.

11. The display device according to claim 10, wherein the backlight module further comprises a plurality of light-emitting elements, and light emitted by the plurality of light-emitting elements is reflected by the at least one optical layer and then advances toward the first reflective element.

12. The display device according to claim 10, wherein the backlight module further comprises a light guide plate, and the first reflective element is disposed between the light guide plate and the lens assembly.

13. The display device according to claim 12, wherein the light guide plate comprises an area corresponding to the first reflective element, and the area has no through hole.

14. The display device according to claim 12, wherein the backlight module further comprises a reflective layer, and the reflective layer and the first reflective element are arranged in a same layer.

* * * * *